(12) United States Patent
Zou et al.

(10) Patent No.: US 12,193,008 B2
(45) Date of Patent: Jan. 7, 2025

(54) UPLINK CONTROL INFORMATION PRE-EMPTION
(71) Applicant: Telefonaktiebolaget LM Ericsson (publ), Stockholm (SE)
(72) Inventors: Zhenhua Zou, Solna (SE); Jonas Fröberg Olsson, Ljungsbro (SE); Abdulrahman Alabbasi, Kista (SE); Mattias Andersson, Sundbyberg (SE); Yufei Blankenship, Kildeer, IL (US)
(73) Assignee: Telefonaktiebolaget LM Ericsson (Publ), Stockholm (SE)
( * ) Notice: Subject to any disclaimer, the term of this patent is extended or adjusted under 35 U.S.C. 154(b) by 537 days.
(21) Appl. No.: 17/422,018
(22) PCT Filed: Jan. 9, 2020
(86) PCT No.: PCT/EP2020/050470
§ 371 (c)(1),
(2) Date: Jul. 9, 2021
(87) PCT Pub. No.: WO2020/144299
PCT Pub. Date: Jul. 16, 2020
(65) Prior Publication Data
US 2022/0104241 A1    Mar. 31, 2022

Related U.S. Application Data
(60) Provisional application No. 62/790,896, filed on Jan. 10, 2019.
(51) Int. Cl.
*H04W 72/21*   (2023.01)
*H04L 5/00*    (2006.01)
(Continued)
(52) U.S. Cl.
CPC ........... *H04W 72/21* (2023.01); *H04L 5/0051* (2013.01); *H04W 72/1263* (2013.01); *H04W 72/542* (2023.01); *H04W 72/569* (2023.01)
(58) Field of Classification Search
CPC ............. H04W 72/21; H04W 72/1263; H04W 72/542; H04W 72/569; H04W 72/1268; H04L 5/0051; H04L 5/0044; H04L 5/0053
See application file for complete search history.

(56) References Cited

U.S. PATENT DOCUMENTS

2011/0243012 A1\* 10/2011 Luo ...................... H04L 5/0057
370/252
2012/0230268 A1   9/2012 Marinier et al.
(Continued)

FOREIGN PATENT DOCUMENTS

| EP | 2562949 A2 | 2/2013 |
| WO | 2015016625 A1 | 2/2015 |
| WO | 2018203409 A1 | 11/2018 |

OTHER PUBLICATIONS

3GPP TSG RAN meeting #81 RP-182090; Title: Revised SID: Study on NR Industrial Internet of Things (IoT); Source: Nokia, Nokia Shanghai Bell; Document for: Approval; Agenda Item: 9.3.12; Date and Location: Sep. 10-13, 2018, Gold Coast, Australia; consisting of 5 pages.
(Continued)

*Primary Examiner* — Tejis Daya
(74) *Attorney, Agent, or Firm* — Weisberg I.P. Law, P.A.

(57) ABSTRACT

A method, system and apparatus are disclosed. According to one or more embodiments, a wireless device is provided. The wireless device includes processing circuitry configured to determine a first priority of UCI based at least in part on a UCI type where the UCI is preempted by a preempting scheduled uplink shared channel data transmission, and determine whether to include the UCI in the preempting scheduled data transmission based at least in part on the first priority.

17 Claims, 7 Drawing Sheets

(51) Int. Cl.
*H04W 72/1263* (2023.01)
*H04W 72/542* (2023.01)
*H04W 72/566* (2023.01)

(56) References Cited

U.S. PATENT DOCUMENTS

| | | | |
|---|---|---|---|
| 2013/0229998 A1* | 9/2013 | Noh | H04L 27/2636 |
| | | | 370/329 |
| 2015/0110029 A1* | 4/2015 | Hwang | H04L 1/1671 |
| | | | 370/329 |
| 2015/0341150 A1* | 11/2015 | Seo | H04L 69/22 |
| | | | 370/336 |
| 2016/0183290 A1 | 6/2016 | Ko et al. | |
| 2018/0007667 A1* | 1/2018 | You | H04L 5/0051 |
| 2018/0278380 A1* | 9/2018 | Kim | H04L 1/1812 |
| 2019/0215781 A1* | 7/2019 | Jeon | H04W 52/365 |
| 2020/0154496 A1* | 5/2020 | Yi | H04W 72/04 |

OTHER PUBLICATIONS

International Search Report and Written Opinion dated Mar. 18, 2020 for International Application No. PCT/EP2020/050470 filed Jan. 9, 2020, consisting of 9 pages.
Chinese Office Action and English Summary dated Oct. 28, 2023 for Application No. 202080019605.9, consisting of 9 pages.

* cited by examiner

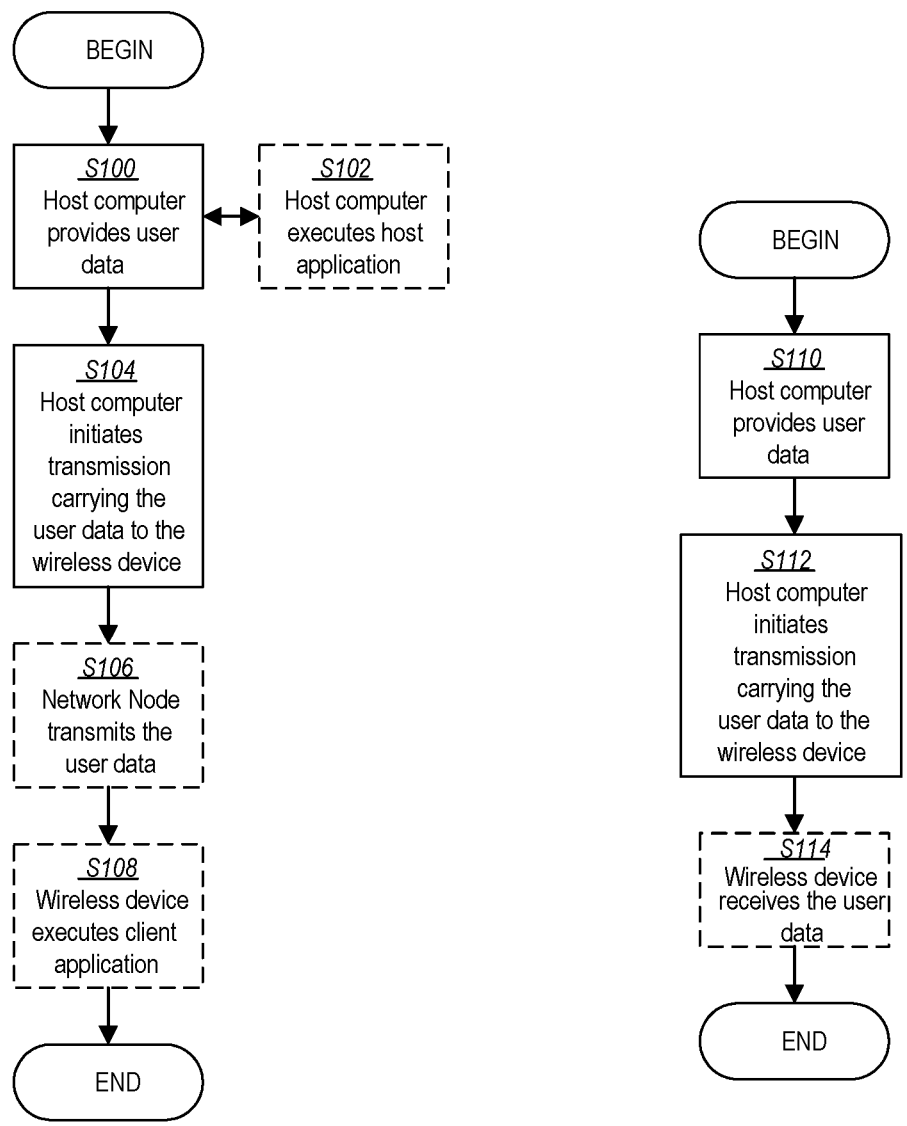

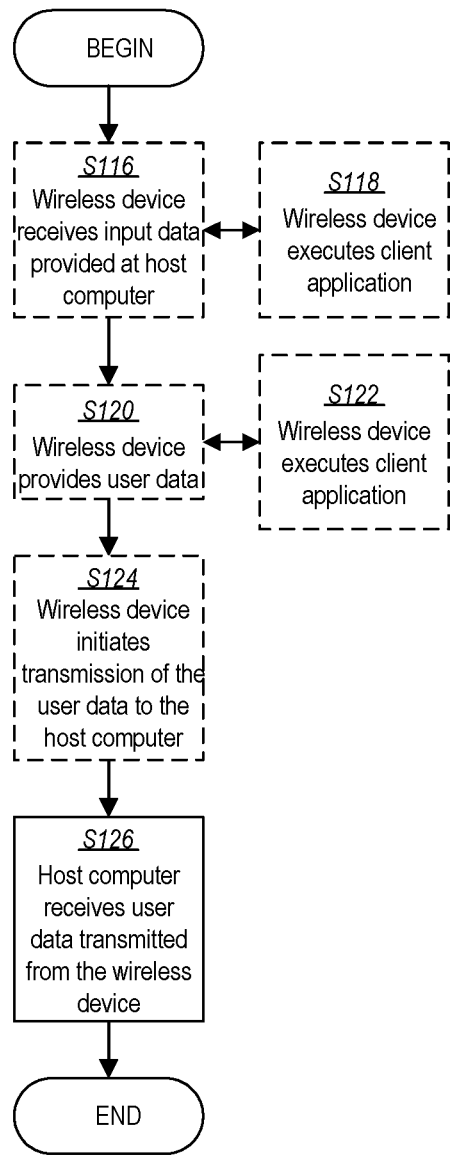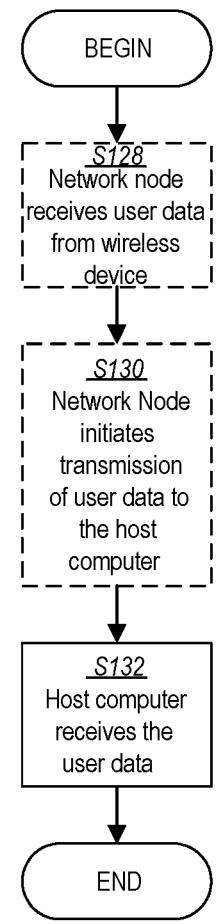
FIG. 5
FIG. 6

UPLINK CONTROL INFORMATION PRE-EMPTION

CROSS-REFERENCE TO RELATED APPLICATIONS

This application is a Submission Under 35 U.S.C. § 371 for U.S. National Stage Patent Application of International Application No.: PCT/EP2020/050470, filed Jan. 9, 2020 entitled "UPLINK CONTROL INFORMATION PRE-EMPTION," which claims priority to U.S. Provisional Application No. 62/790,896, filed Jan. 10, 2019, entitled "RE-ALLOCATION OF UPLINK CONTROL INFORMATION IN INTRA-WIRELESS DEVICE UPLINK PRE-EMPTION" the entireties of both of which are incorporated herein by reference.

TECHNICAL FIELD

The present disclosure relates to wireless communications, and in particular, to the transmission of control information from an at least partially preempted shared channel.

BACKGROUND

Third Generation Partnership Project (3GPP) New Radio (NR) Release 15 (Rel-15)

Uplink (UL) traffic (from wireless device to network node) can be scheduled with dynamic UL grants or configured UL grants. In case of dynamic grants, the network node, e.g., gNB, provides an UL grant to the wireless device, e.g., user equipment (UE), for each UL transmission. Configured grants are pre-allocated, i.e., provided once, for example, to the wireless device, thereafter the configured UL grant is valid for usage for UL transmissions according to a configured periodicity. The wireless device does not need to transmit padding (e.g., zero padding) on the configured UL resources if no UL data is available for transmission, i.e., may skip an UL transmission on such grants if UL data is not to be transmitted.

3GPP NR further supports two types of transmissions, Type A and Type B. Type A transmissions are slot-based, starting from the beginning of the slot, where a slot is defined as 14 Orthogonal frequency-division multiplexing (OFDM) symbols, while Type B is non-slot-based, and can start at later points in the slot. The purpose with Type B is to enable making short transmissions that can start and end in a more flexible way than Type A. Type B transmissions can be dynamically scheduled, and in 3GPP NR Rel-15 and may include one or more of the following properties:

Can be of length 7, 4, or 2 symbols, e.g., OFDM symbols, in the downlink (DL), and can be of any length UL;
Can start and end within in any symbol within a slot.

Type B transmissions may be of use for URLLC (Ultra-Reliable Low-Latency Communication) since Type B transmissions reduce latency, and the transmissions can be scheduled and start sooner than for slot-based transmissions where scheduling and transmissions may need to wait until the next slot.

3GPP NR supports two types of configured grants, Type 1 and Type 2. For Type 1 the wireless device is radio resource control (RRC) configured with a grant that indicates all needed transmission parameters, while for Type 2 the configured grant is partly RRC configured and partly L1, e.g., layer 1, signaled (downlink control information (DCI) signaling). For Type 2 configured grants, the resource allocation follows a UL grant received on the DCI and the resource then recurs periodically whose period is configured by RRC. The UL grant has the time domain resource assignment field that provides a row index of a higher layer, i.e., communication or transmission layer, configured table Physical Uplink Shared Channel (PUSCH)-symbolAllocation, where the indexed row defines the slot offset K2, the start and length indicator (SLIV), and the PUSCH mapping type to be applied in the PUSCH transmission. The wireless device transmits a MAC-CE (Medium Access Control-Control Element) confirm message when the configured grant is activated or deactivated.

Industrial Internet of Things (IIoT) and Mixed Services

In 3GPP NR Release 15, basic support for URLLC was introduced with Transmission Time Interval (TTI) structures for low latency as well as methods for improved reliability. In a newly defined 3GPP study item (3GPP group RAN (RP)-182090, Revised SID: Study on NR Industrial Internet of Things (IIoT)), NR technology enhancements are studied with the target of providing more deterministic low-latency delivery of data. This new 3GPP NR Rel-16 study item NR Industrial Internet of Things (IIoT) is to further enhance the support for URLLC (Ultra Reliable Low Latency Communications), using existing solutions for 3GPP NR as the baseline.

A typical NR-IIoT device may handle communication for multiple service types, e.g. periodic URLLC type robot control messages, URLLC type of occasional alarm signals (for which periodic resources may need to be configured), occasional sensor data transmission, other mobile broadband (MBB) type traffic such as occasional video transmissions or software updates. This may lead to a traffic mix, i.e., service type mix, to be multiplexed by the wireless device for UL transmissions, i.e., on MAC multiple logical channels with different priorities would need to be configured for this traffic mix.

One of the items is to study UL/DL intra-wireless device prioritization/multiplexing, i.e. prioritization (for example dropping, delaying or puncturing lower priority service) between different categories of traffic in the wireless device, including both data and control channels and considering: 1. different latency and reliability requirements; 2. different types of resource allocation for example grant-free and grant-based allocations.

Industrial nodes are expected to have traffic with different quality of service (QoS) requirements. For example, an industrial robot might have actuators, sensors, cameras, etc., and each generates a data stream with different needs/requirements, e.g., periodicity, reliability, latency, and packet size. Hence, the network node may allocate a suitable grant for each such stream. For instance, traffic/stream with deterministic periodicity and packet size, would most likely be served via a configured grant.

Another possibility to allocate the configured grant is for the case where the network node was not sure about, i.e., unable to determine, the data stream's periodicity. That is, the network node knows about all possible transmission occasions of this critical application, but the application did not always transmit over those occasions. On the other hand, the requested delivery latency (for such stream) is very short, that cannot wait for the conventional dynamic grant procedures (starting with scheduling request (SR)/buffer status report (BSR), then granting via a physical downlink control channel (PDCCH), then transmission). If the network node knows about the potential occasions at which data will arrive, then the network node would allocate a configured grant with very short periodicity in order to capture all.

Of course, the basic dynamic scheduling method of using dynamic UL grant is not precluded to serve the critical traffic. This is best suited for alarm-type of traffic which is infrequent.

UL Intra-Wireless Device Preemption

In UL intra-wireless device preemption, there are three cases when two UL grants from one wireless device can overlap. The first case is on dynamic grant versus configured grant. In 3GPP NR Rel-15, a dynamic grant always overrides a configured grant. In case the configured grant is configured mainly for critical traffic, however, this dynamic grant from the network node may also need to be able to serve the critical traffic, for example, with mini-slot and with a lower Block Error Rate (BLER) target. This may be done in order to ensure fast and robust delivery of the critical traffic when the dynamic grant overrides the configured grant (for which robust allocation is assumed as it is intended to serve the critical traffic). This leads to inefficiencies when scheduling with dynamic grants, which are typically intended to serve broadband best effort traffic.

To overcome these inefficiencies, it has been proposed that the wireless device can be allocated both dynamic grant and configured grant and if Logical Channel Prioritization (LCP) in MAC can obtain data for the configured grant, then the transmission according to configured grant can pre-empt the transmission of the dynamic grant.

The second case is about two dynamic grants of different lengths, i.e., partial time-overlap. The network node can send two time overlapping dynamic UL grants due to the flexibility in time-resource allocation. The reason for sending a new overlapping UL grant is that the network node learns of the arrival of the new critical traffic at the wireless device through SR or BSR.

The third case is about the overlapping of two configured grants (CG). A single CG configuration within a cell/bandwidth part (BWP) can support industrial streams/flows with similar periods and other requirements (such as, latency, reliability, jitter, etc.). However, in industrial networks, multiple streams (flows) generated at a node is a very common use-case, e.g., a robot arm with several actuators, sensors and monitoring devices; yet connected to a single radio module and so no carrier aggregation (CA)/dual connectivity (DC). As a result, such multiple streams differ in its characteristics, e.g., arrival time, and payload size. Furthermore, multiple streams can be characterized by different periodicity, latency and reliability requirements. These streams may not be supported via single configuration CG, even if this configuration was supporting very short periodicity, because the CG will have the same configuration parameters, e.g., MCS index, latency, slot period, K-repetition, which may not be suitable for some streams.

A potential enhancement of CG/semi-persistent scheduling (SPS) is to enable multiple configurations for a wireless device within a single serving cell/BWP. This enables the wireless device to have multiple pre-configured transmission occasions with different settings, e.g. periodicity, time offset, frequency resources, MCS index, etc.

In other words, in all of the above three cases, the network node can allocate the resources to the wireless device in such a way that the wireless device may have to choose between two UL grants. Furthermore, due to the flexibility of the start position of the PUSCH transmission and the duration of the PUSCH transmission, the situation can occur where the transmission of one PUSCH can pre-empt the transmission of another PUSCH.

Uplink Control Information (UCI) on PUSCH

When the wireless device has uplink control information (UCI) to transmit at the same time as data, the wireless device transmits the UCI simultaneously on PUSCH instead of on the Physical Uplink Control Channel (PUCCH). This is referred to, herein, as multiplexing of UCI on PUSCH. If the only UCI to transmit is one or two Hybrid Automatic Repeat Request (HARQ) feedback bits, then these HARQ feedback bits are punctured into the data transmitted on PUSCH. If the wireless device transmits more than two HARQ feedback bits, or transmits CSI reports, then the data is rate matched around the UCI. In 3GPP NR Rel. 15, scheduling requests are not multiplexed on PUSCH, instead a buffer status report is sent as part of the data.

SUMMARY

Some embodiments advantageously provide methods, systems, network node and wireless device for relocating/transmitting control information from an at least partially preempted shared channel.

The reason for pre-emption of one PUSCH by another PUSCH is that the pre-empting PUSCH carries more critical data than data carried by the other. However, in existing discussions, only the importance of the traffic multiplexed on the PUSCH is considered. It is not clear what to do in case there are UCI multiplexed on the pre-empted PUSCH. Another issue may include how to handle collision associated with a preempting PUSCH with Sounding Reference Signal (SRS).

The disclosure solves at least some of the problem described above by providing a system and methods to re-allocate and/or determine whether to transmit at least part of the UCI in the preempted UL PUSCH. Therefore, the disclosure advantageously provides that the UCI, which can also be important, in the preempted UL PUSCH is not lost due to intra-wireless device UL preemption. Further, the disclosure advantageously provides for handling of collisions associated with a preempting PUSCH with SRS.

According to one aspect of the disclosure, a wireless device is provided. The wireless device includes processing circuitry configured to determine a first priority of uplink control information, UCI, based at least in part on a UCI type where the UCI is preempted by a preempting scheduled uplink shared channel data transmission, and determine whether to include the UCI in the preempting scheduled data transmission based at least in part on the first priority.

According to one or more embodiments, the UCI includes a first portion and a second portion, the first portion of the UCI having the first priority. According to one or more embodiments, the processing circuitry is further configured to determine a second priority of the second portion of the UCI based at least in part on the UCI type, and determine whether to include the second portion of the UCI in the preempting scheduled data transmission based at least in part on the second priority. According to one or more embodiments, the UCI type corresponds to a Channel State Information, CSI, type. According to one or more embodiments, the CSI type is one of a periodic type, semi-persistent type and aperiodic type where the periodic type and semi-persistent type corresponding to a priority that is omitted from inclusion in the preempting scheduled data transmission and where the aperiodic type corresponding to a priority that is included in the preempting scheduled data transmission. According to one or more embodiments, the UCI type corresponds to hybrid automatic repeat request, HARQ, feedback for a shared channel transmission.

According to one or more embodiments, the UCI type corresponds to a sounding reference signal, SRS, type. According to one or more embodiments, the SRS type is one of periodic type, semi-persistent type and aperiodic type, the periodic type and semi-persistent type corresponding to a priority that is omitted from inclusion in the preempting scheduled data transmission, the aperiodic type corresponding to a priority that is included in the preempting scheduled data transmission. According to one or more embodiments, the determining whether to include the UCI in the preempting scheduled data transmission is based on a quantity of bits in the UCI. According to one or more embodiments, the determining whether to include the UCI in the preempting scheduled data transmission is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

According to another aspect of the disclosure, a method implemented by a wireless device, is provided. A first priority of uplink control information, UCI, is determined based at least in part on a UCI type where the UCI is preempted by a preempting scheduled uplink shared channel data transmission. A determination is made whether to include the UCI in the preempting scheduled data transmission based at least in part on the first priority.

According to one or more embodiments, the UCI includes a first portion and a second portion, the first portion of the UCI having the first priority. According to one or more embodiments, a second priority of the second portion of the UCI is determined based at least in part on the UCI type, and a determination is made whether to include the second portion of the UCI in the preempting scheduled data transmission based at least in part on the second priority. According to one or more embodiments, the UCI type corresponds to a Channel State Information, CSI, type.

According to one or more embodiments, the CSI type is one of a periodic type, semi-persistent type and aperiodic type where the periodic type and semi-persistent type corresponds to a priority that is omitted from inclusion in the preempting scheduled data transmission, and where the aperiodic type corresponds to a priority that is included in the preempting scheduled data transmission. According to one or more embodiments, the UCI type corresponds to hybrid automatic repeat request, HARQ, feedback for a shared channel transmission. According to one or more embodiments, the UCI type corresponds to a sounding reference signal, SRS, type.

According to one or more embodiments, the SRS type is one of periodic type, semi-persistent type and aperiodic type where the periodic type and semi-persistent type corresponds to a priority that is omitted from inclusion in the preempting scheduled data transmission, and where the aperiodic type corresponds to a priority that is included in the preempting scheduled data transmission. According to one or more embodiments, the determining whether to include the UCI in the preempting scheduled data transmission is based on a quantity of bits in the UCI. According to one or more embodiments, the determining whether to include the UCI in the preempting scheduled data transmission is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

According to another aspect of the disclosure, a network node is provided. The network node includes processing circuitry configured to schedule a wireless device for uplink shared channel data transmission on allocated resources where the scheduled data transmission on the allocated resources preempts uplink control information, UCI, and receive the UCI in the scheduled data transmission on the allocated resources based at least in part on a first priority of the UCI where the first priority is based at least in part on a UCI type of the UCI.

According to one or more embodiments, the UCI include a first portion and a second portion, the first portion of the UCI having a first priority. According to one or more embodiments, the second portion of the UCI is received in the scheduled data transmission on the allocated resources based at least in part on a second priority of the second portion of the UCI where the second priority is based at least in part on a UCI type of the second portion of the UCI. According to one or more embodiments, the UCI type corresponds to a Channel State Information, CSI, type.

According to one or more embodiments, the CSI type is one of a periodic type, semi-persistent type and aperiodic type where the periodic type and semi-persistent type corresponding to a priority that is omitted from inclusion in the allocated resources, and where the aperiodic type corresponds to a priority that is included in the allocated resources. According to one or more embodiments, the UCI type corresponds to hybrid automatic repeat request, HARQ, feedback for a shared channel transmission. According to one or more embodiments, the UCI type corresponds to a sounding reference signal, SRS, type.

According to one or more embodiments, the SRS type is one of periodic type, semi-persistent type and aperiodic type where the periodic type and semi-persistent type corresponds to a priority that is omitted from inclusion in the allocated resources, and where the aperiodic type corresponds to a priority that is included in the allocated resources. According to one or more embodiments, the receiving of the UCI in the scheduled data transmission on the allocated resources is based on a quantity of bits in the UCI. According to one or more embodiments, the receiving of the UCI in the scheduled data transmission on the allocated resources is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

According to another aspect of the disclosure, a method implemented by a network node is provided. A wireless device is scheduled for uplink shared channel data transmission on allocated resources where the scheduled data transmission on the allocated resources preempts uplink control information, UCI. The UCI is received in the scheduled data transmission on the allocated resources based at least in part on a first priority of the UCI where the first priority is based at least in part on a UCI type of the UCI.

According to one or more embodiments, the UCI includes a first portion and a second portion where the first portion of the UCI has a first priority. According to one or more embodiments, the second portion of the UCI is received in the scheduled data transmission on the allocated resources based at least in part on a second priority of the second portion of the UCI where the second priority is based at least in part on a UCI type of the second portion of the UCI. According to one or more embodiments, the UCI type corresponds to a Channel State Information, CSI, type.

According to one or more embodiments, the CSI type is one of a periodic type, semi-persistent type and aperiodic type where the periodic type and semi-persistent type corresponds to a priority that is omitted from inclusion in the allocated resources, and where the aperiodic type corresponding to a priority that is included in the allocated resources. According to one or more embodiments, the UCI type corresponds to hybrid automatic repeat request, HARQ, feedback for a shared channel transmission. According to one or more embodiments, the UCI type corresponds to a sounding reference signal, SRS, type.

According to one or more embodiments, the SRS type is one of periodic type, semi-persistent type and aperiodic type, where the periodic type and semi-persistent type corresponds to a priority that is omitted from inclusion in the allocated resources, and where the aperiodic type corresponds to a priority that is included in the allocated resources. According to one or more embodiments, the receiving of the UCI in the scheduled data transmission on the allocated resources is based on a quantity of bits in the UCI. According to one or more embodiments, the receiving of the UCI in the scheduled data transmission on the allocated resources is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

According to another aspect of the disclosure, a computer program, program product or computer storage medium is provided. The computer program, program product or computer storage medium includes instructions which when executed on a processor performs any one of the methods described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
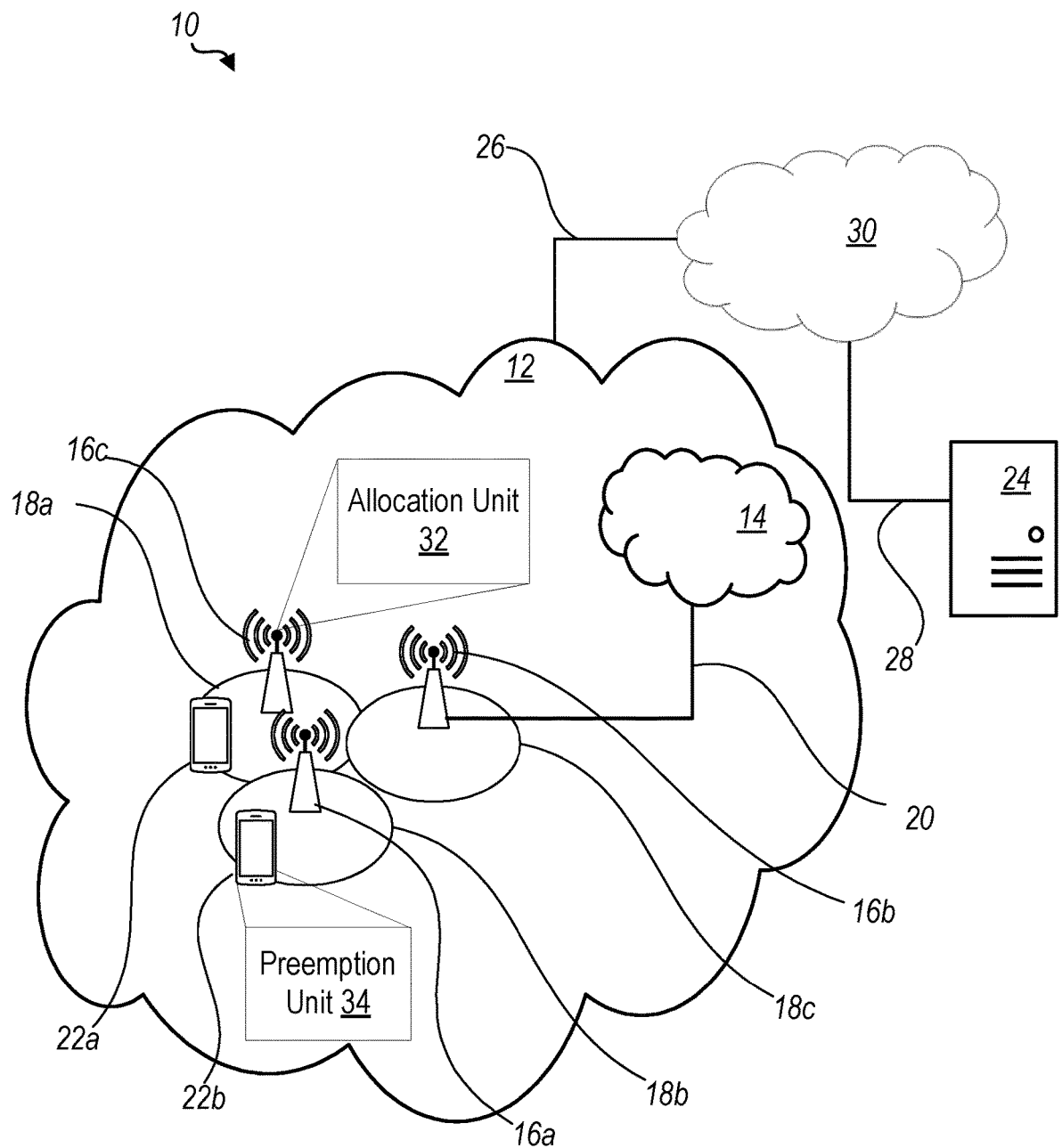
FIG. 1 is a schematic diagram of an exemplary network architecture illustrating a communication system connected via an intermediate network to a host computer according to the principles in the present disclosure.

A reason for pre-emption of one PUSCH by another PUSCH is that the pre-empting PUSCH carries more critical data than data carried by the other. However, in existing discussions, only the importance of the traffic multiplexed on the PUSCH is considered. It is not clear what to do when there are UCIs multiplexed on the pre-empted PUSCH.

The disclosure solves at least some of the problem described above by providing a system and methods to re-allocate the UCI in the preempted UL PUSCH. Therefore, the disclosure advantageously provides that the UCI, which can also be important, in the preempted UL PUSCH is not lost due to intra-wireless device UL preemption.

Although the present disclosure is described within the context of 3GPP NR radio technology, it is understood that the problems and solutions described herein are equally applicable to wireless access networks and user-equipment (UE) implementing other access technologies and standards. NR is used as an example technology for description due to the ease of understanding the problem, and solutions solving the problem. The disclosure is applicable also to 3GPP LTE, or 3GPP LTE and NR integration, also denoted as non-standalone NR.

The term resource used herein may correspond to any type of physical resource or radio resource expressed in terms of length of time and/or frequency. Signals are transmitted or received by a radio node over a time resource. Examples of time resources are: symbol, time slot, sub-frame, radio frame, Transmission Time Interval (TTI), interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources, instructed to resolve and/or how to resolve the preemption described herein. Uplink resources and/or downlink resources may be scheduled and/or provided with allocation or configuration data.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Generally, with puncturing, the information related to a physical channel or signal is mapped to resource elements in the normal way; and in a second step those resource elements that should be empty or carry information related to another physical channel or signal are set to zero and/or replaced by the other channels/signals information. In other words, puncturing means that the transmitter deletes the modulation symbols (from a first channel) originally mapped to the punctured resource elements and replaces it with modulation symbols corresponding to the second signal.

Before describing in detail exemplary embodiments, it is noted that the embodiments reside primarily in combinations of apparatus components and processing steps related to relocating control information from a preempted shared channel. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for relocating control information from an at least partially preempted shared channel.

Referring now to the drawing figures, in which like elements are referred to by like reference designators, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device 22 is in the coverage area or where a sole wireless device 22 is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

Figure 7:
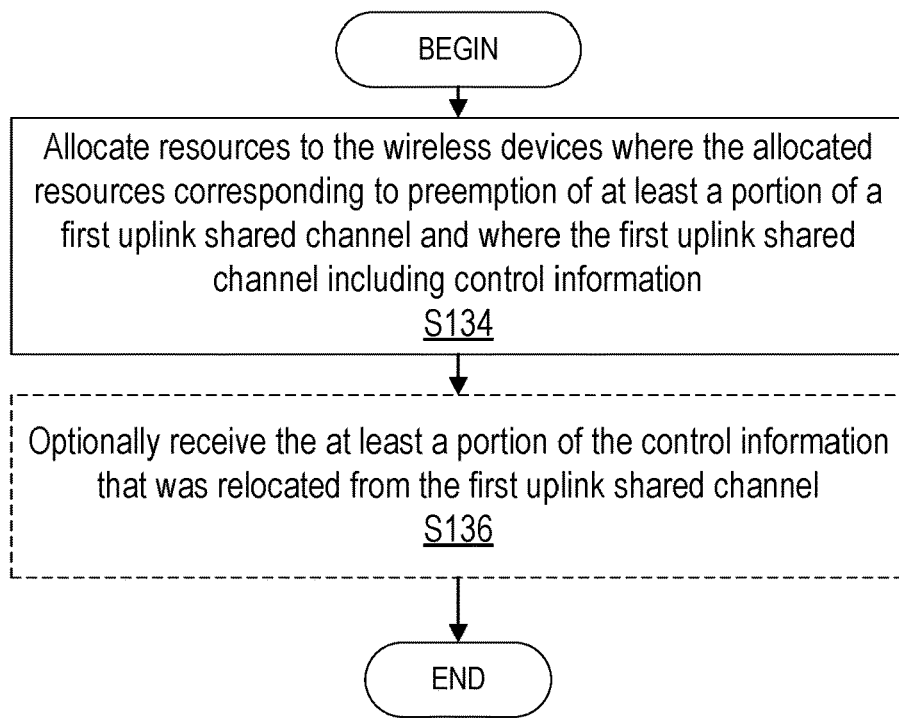
FIG. 7 is a flowchart of an exemplary process in a network node according to some embodiments of the present disclosure.
Figure 8:
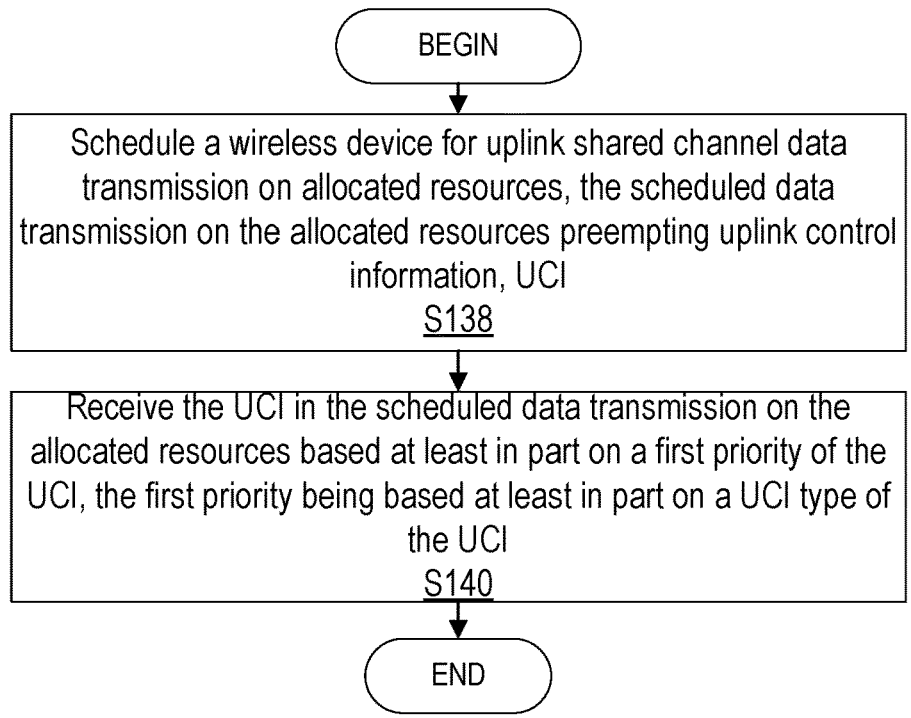
FIG. 8 is a flowchart of another exemplary process in a network node according to some embodiments of the present disclosure.

A network node 16 is configured to include an allocation unit 32 which is configured to perform one or more processes described herein such as those described with respect to FIG. 7 and/or FIG. 8, for example. A wireless device 22 is configured to include a preemption unit 34 which is configured to perform one or more processes described herein such as those described with respect to FIG. 9 and/or FIG. 10, for example.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, forward, determine, receive, transmit, process, etc., information related to relocating control information from a preempted shared channel.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include allocation unit 32 configured to allocate resources corresponding to preempted control information, i.e., UCI.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a preemption unit 34 configured to relocate at least a portion of control information if at least a portion of an uplink shared channel (i.e., PUSCH) is preempted, i.e., generally resolves the preemption situation with respect to at least a portion of the control information (i.e., UCI).

Figure 2:
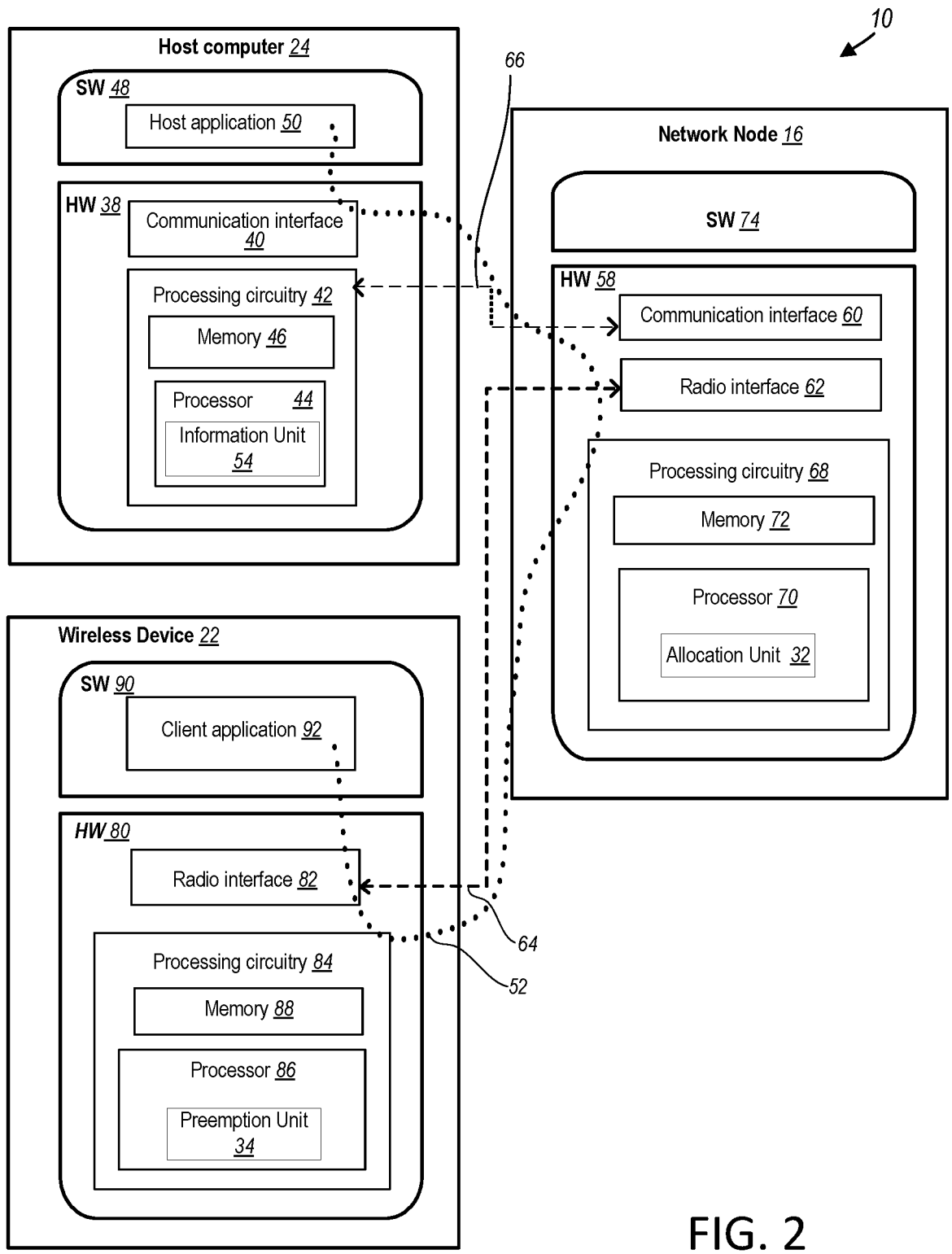
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as allocation unit 32, and preemption unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 114, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 114, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 114 (Block S122). In providing the user data, the executed client application 114 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 7 is a flowchart of an exemplary process in a network node 16 according to one or more embodiments of the present disclosure. One or more Blocks and/or functions performed by network node 16 may be performed by one or more elements of network node 16 such as by allocation unit 32 in processing circuitry 68, processor 70, radio interface 62, etc. In one or more embodiments, network node 16 such as via one or more of processing circuitry 68, processor 70 and radio interface 62 is configured to allocate (Block S134) resources to the wireless devices where the allocated resources corresponding to preemption of at least a portion of a first uplink shared channel and where the first uplink shared channel including control information. In one or more embodiments, network node 16 such as via one or more of processing circuitry 68, processor 70 and radio interface 62 is configured to optionally receive (Block S136) the at least a portion of the control information that was relocated from the first uplink shared channel.

According to one or more embodiments, the at least a portion of the control information is relocated to a second uplink shared channel and has at least one different characteristic than when the UCI was scheduled on the first uplink shared channel. According to one or more embodiments, the at least one different characteristic includes at least one of beta-factors and encoding.

FIG. 8 is a flowchart of another exemplary process in a network node 16 according to one or more embodiments of the present disclosure. One or more Blocks and/or functions performed by network node 16 may be performed by one or more elements of network node 16 such as by allocation unit 32 in processing circuitry 68, processor 70, radio interface 62, etc. In one or more embodiments, network node 16 such as via one or more of processing circuitry 68, processor 70 and radio interface 62 is configured to schedule (Block S138) a wireless device 22 for uplink shared channel data transmission on allocated resources where the scheduled data transmission on the allocated resources preempts UCI, as described herein. In one or more embodiments, network node 16 such as via one or more of processing circuitry 68, processor 70 and radio interface 62 is configured to receive (Block S140) the UCI in the scheduled data transmission on the allocated resources based at least in part on a first priority of the UCI where the first priority is based at least in part on a UCI type of the UCI, as described herein.

According to one or more embodiments, the UCI include a first portion and a second portion where the first portion of the UCI has a first priority. According to one or more embodiments, the processing circuitry is further configured to receive a second portion of the UCI in the scheduled data transmission on the allocated resources based at least in part on a second priority of the second portion of the UCI, the second priority being based at least in part on a UCI type of the second portion of the UCI. According to one or more embodiments, the UCI type corresponds to a Channel State Information, CSI, type.

According to one or more embodiments, the CSI type is one of a periodic type, semi-persistent type and aperiodic type, the periodic type and semi-persistent type corresponding to a priority that is omitted from inclusion in the allocated resources, the aperiodic type corresponding to a priority that is included in the allocated resources. According to one or more embodiments, the UCI type corresponds to hybrid automatic repeat request, HARQ, feedback for a shared channel transmission. According to one or more embodiments, the UCI type corresponds to a sounding reference signal, SRS, type.

According to one or more embodiments, the SRS type is one of periodic type, semi-persistent type and aperiodic type, the periodic type and semi-persistent type corresponding to a priority that is omitted from inclusion in the allocated resources, the aperiodic type corresponding to a priority that is included in the allocated resources. According to one or more embodiments, the receiving of the UCI in the scheduled data transmission on the allocated resources is based on a quantity of bits in the UCI. According to one or more embodiments, the receiving of the UCI in the scheduled data transmission on the allocated resources is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

Figure 9:
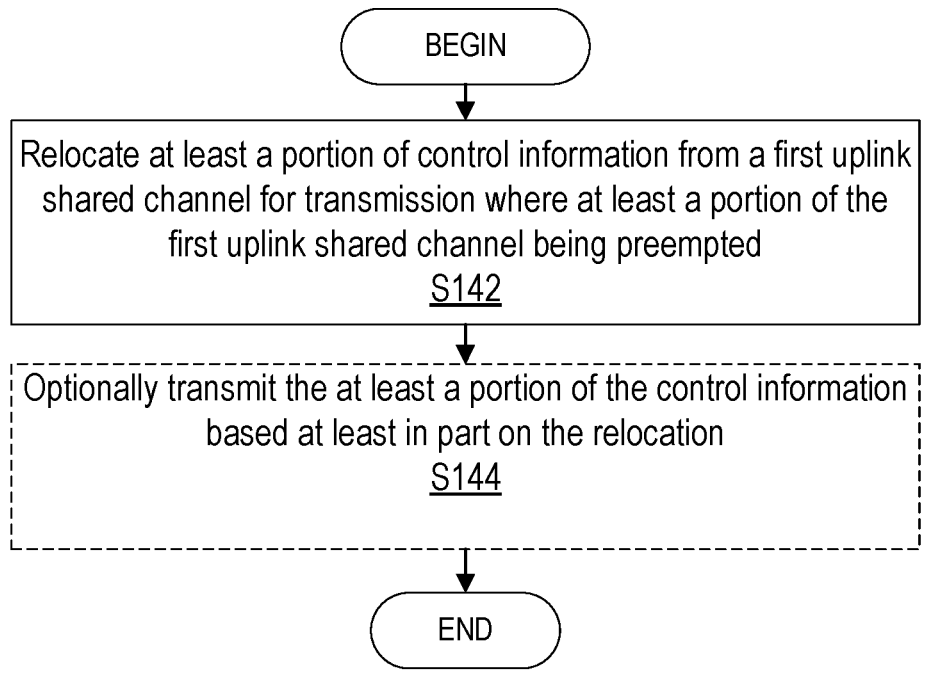
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by preemption unit 34 in processing circuitry 84, processor 86, radio interface 82, etc. In one or more embodiments, wireless device 22 such as via one or more of processing circuitry 84, processor 86 and radio interface 82 is configured to relocate (Block S142) at least a portion of control information from a first uplink shared channel for transmission, at least a portion of the first uplink shared channel being preempted. In one or more embodiments, wireless device 22 such as via one or more of processing circuitry 84, processor 86 and radio interface 82 is configured to optionally transmit (Block S144) the at least a portion of the UCI based at least in part on the relocation.

According to one or more embodiments, the at least a portion of the control information is relocated to a second uplink shared channel and has at least one different characteristic than when the UCI was scheduled on the first uplink shared channel. According to one or more embodiments, the at least one different characteristic includes at least one of beta-factors and encoding.

Figure 10:
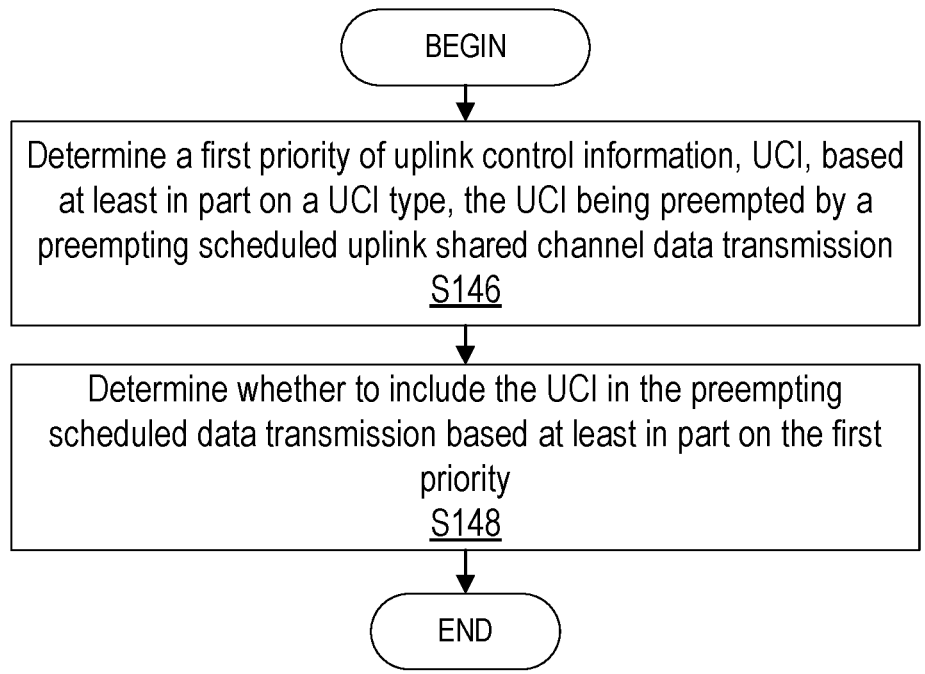
FIG. 10 is a flowchart of another exemplary process in a wireless device according to some embodiments of the present disclosure.

FIG. 10 is a flowchart of another exemplary process in a wireless device 22 according to some embodiments of the present disclosure. One or more Blocks and/or functions performed by wireless device 22 may be performed by one or more elements of wireless device 22 such as by preemption unit 34 in processing circuitry 84, processor 86, radio interface 82, etc. In one or more embodiments, wireless device 22 such as via one or more of processing circuitry 84, processor 86 and radio interface 82 is configured to determine (Block S146) a first priority of uplink control information, UCI, based at least in part on a UCI type where the UCI is preempted by a preempting scheduled uplink shared channel data transmission, as described herein. In one or more embodiments, wireless device 22 such as via one or more of processing circuitry 84, processor 86 and radio interface 82 is configured to determine (Block S148) whether to include the UCI in the preempting scheduled data transmission based at least in part on the first priority, as described herein.

According to one or more embodiments, the UCI includes a first portion and a second portion, the first portion of the UCI having the first priority. According to one or more embodiments, the processing circuitry is further configured to: determine a second priority of the second portion of the UCI based at least in part on the UCI type, and determine whether to include the second portion of the UCI in the preempting scheduled data transmission based at least in part on the second priority. According to one or more embodiments, the UCI type corresponds to a Channel State Information, CSI, type.

According to one or more embodiments, the CSI type is one of a periodic type, semi-persistent type and aperiodic type where the periodic type and semi-persistent type corresponding to a priority that is omitted from inclusion in the preempting scheduled data transmission and where the aperiodic type corresponds to a priority that is included in the preempting scheduled data transmission. According to one or more embodiments, the UCI type corresponds to hybrid automatic repeat request, HARQ, feedback for a shared channel transmission. According to one or more embodiments, the UCI type corresponds to a sounding reference signal, SRS, type.

According to one or more embodiments, the SRS type is one of periodic type, semi-persistent type and aperiodic type, the periodic type and semi-persistent type corresponding to a priority that is omitted from inclusion in the preempting scheduled data transmission, the aperiodic type corresponding to a priority that is included in the preempting scheduled data transmission. According to one or more embodiments, the determining whether to include the UCI in the preempting scheduled data transmission is based on a quantity of bits in the UCI. According to one or more embodiments, the determining whether to include the UCI in the preempting scheduled data transmission is based on a type of Hybrid Automatic Repeat Request, HARQ, codebook. According to one or more embodiments, a plurality of UCI bits of the UCI are multiplexed on a first physical uplink shared channel, PUSCH, that is pre-empted by a second PUSCH.

Having generally described arrangements relocating control information from an at least partially preempted shared channel, details for these arrangements, functions and processes are provided as follows, and which may be implemented by the network node 16, wireless device 22 and/or host computer 24.

Embodiments provide relocating control information from an at least partially preempted shared channel.

In one or more embodiments described herein preemption of a PUSCH and/or UCI may generally corresponds to preempting at least a portion of control information (i.e., UCI) and/or preempting at least a portion of the shared channel (i.e., PUSCH) such that resources scheduled on and/or for a first shared channel (i.e., PUSCH 1) are instead used for a second shared channel (i.e., PUSCH 2), for example. The wireless device 22 such as via one or more of processing circuitry 84, processor 86, radio interface 82, preemption unit 34, etc., may then take steps in response to the preemption, as described herein.

Figure 11:
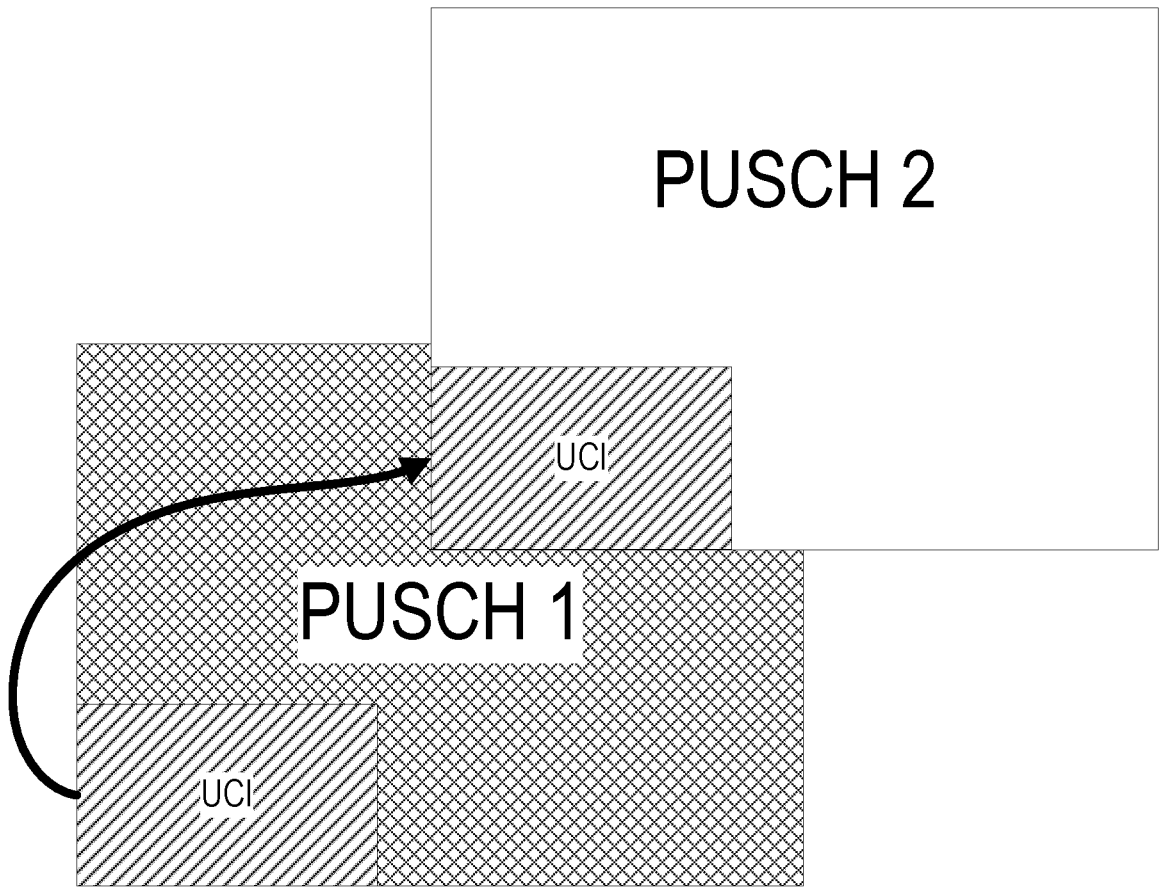
FIG. 11 is a diagram of a relating UCI if a PUSCH is being preempted by another PUSCH.

In one embodiment, UCIs, i.e., control information, multiplexed on the previously pre-empted PUSCH (PUSCH 1 in FIG. 11 that illustrates PUSCH 2 preempting PUSCH 1 where the UCI multiplexed on the PUSCH 1 is multiplexed on the preempting PUSCH 2) are multiplexed on the preempting PUSCH (PUSCH 2 in FIG. 11).

In another variant embodiment, only part of the UCIs multiplexed on the previously pre-empted PUSCH are multiplexed on the pre-empting PUSCH. As a general rule, only those UCIs considered to be critical can be multiplexed again in the pre-empting PUSCH. Examples of control information that may be re-located include:

Example 1. PUCCH transmission from a scheduling request (SR) configuration that is mapped to a critical logical channel (LCH), Example 2. ACK/NACK of a PDSCH transmission that is characterized as reliable downlink transmission, such as short PDSCH duration, with a reliable MCS, or any other means.

Example 2a. In one example, whether to multiplex HARQ-ACK with the pre-empting PUSCH is based at least in part on the number of HARQ-ACK bits. A threshold can be defined (e.g., 2 HARQ-ACK bits), such that when the number of HARQ-ACK bits is at or below the threshold (e.g., 1-2 HARQ-ACK bits), then the HARQ-ACK bits are mutliplexed with the pre-empting PUSCH (e.g., PUSCH 2). Otherwise (e.g., more than 2 HARQ-ACK bits or HARQ-ACK bits above a threshold), then the HARQ-ACK bits are discarded. This is because in NR, the number of HARQ-ACK bits can be large, especially when carrier aggregation (CA) is configured, and/or when code block group based HARQ is configured.

Example 2b. In another example, whether to multiplex HARQ-ACK with the pre-empting PUSCH is based at least in part on the type of HARQ codebook, where the HARQ codebook can be semi-static or dynamic. For instance, the HARQ-ACK bits are multiplexed with the pre-empting PUSCH if the HARQ codebook is configured to be dynamic. Otherwise (i.e., the HARQ codebook is semi-static), the HARQ-ACK bits are not transmitted. This is because semi-static HARQ-codebook may tend to have and/or be large in size.

Example 3. CSI related to a significate change in quality beam or related to a robust grant, which is considered to be used for URLLC data.

Example 3a. In one example, periodic/semi-persistent/aperiodic type CSI can be treated differently. For instance, periodic type and semi-persistent type of CSI is not multiplexed and not transmitted with the pre-empting PUSCH, but aperiodic CSI (i.e., triggered by DCI) is still multiplexed with the pre-empting PUSCH.

Example 3b. In another example, when the CSI is split into two parts, the two parts can be treated differently such as via one or more of processing circuitry 84, processor 86, radio interface 82, preemption unit 34, etc. For instance, only CSI-part1 is multiplexed with the pre-empting PUSCH and transmitted, whereas the CSI-part2 is not transmitted.

Example 3c. In another example, the BLER target used in CQI calculation can be used such as via one or more of processing circuitry 84, processor 86, radio interface 82, preemption unit 34, etc., in determining whether the CSI report should be multiplexed with the pre-empting PUSCH. For instance, if the BLER target is relatively low (e.g., 1e-4), then the CSI report is multiplexed and transmitted such as via one or more of processing circuitry 84, processor 86, radio interface 82, preemption unit 34, etc. Otherwise, if the BLER target is relatively high (e.g., 1e-2), then the CSI report is not multiplexed and not transmitted as may be determined such as via one or more of processing circuitry 84, processor 86, radio interface 82, preemption unit 34, etc.

In some embodiments, different beta-factors are applied such as via one or more of processing circuitry 84, processor 86, radio interface 82, preemption unit 34, etc., for the UCI that are multiplexed again in the pre-empting PUSCH compared to the pre-empted PUSCH. Thus, the encoding such as via one or more of processing circuitry 84, processor 86, radio interface 82, preemption unit 34, etc., of UCI relative to PUSCH encoding may be different for pre-empted and pre-empting PUSCH. For example, UCI on pre-empted PUSCH may comprise ACK/NACK related to critical PDSCH while the pre-empted PUSCH data may be non-critical. In this case, a large beta-factor may be applied for ACK/NACK part of the UCI in pre-empted PUSCH. Since pre-empting PUSCH is critical, it may have reliable encoding and beta-factor for ACK/NACK of UCI in pre-empting PUSCH may not need to be large.

In one embodiment, UCIs multiplexed on the previously pre-empted PUSCH (PUSCH 1 in FIG. 11) are multiplexed such as via one or more of processing circuitry 84, processor 86, radio interface 82, preemption unit 34, etc., on the pre-empting PUSCH (PUSCH 2 in FIG. 11).

In another variant embodiment, only part of the UCIs multiplexed on the previously pre-empted PUSCH are multiplexed such as via one or more of processing circuitry 84, processor 86, radio interface 82, preemption unit 34, etc., on the pre-empting PUSCH. As a general rule, only those UCIs considered to be critical can be multiplexed again in the pre-empting PUSCH. Examples include:

PUCCH transmission from a scheduling request (SR) configuration that is mapped to a critical logical channel (LCH), ACK/NACK of a PDSCH transmission that is characterized as reliable downlink transmission, such as short PDSCH duration, with a reliable MCS, or any other means. Note, how this is indicated may not the part of the present disclosure, and is hence not described, although the indication may be performed using methods known in the art, for example.

CSI related to a significate change in the quality beam or related to a robust grant, which is considered to be used for URLLC data.

In some embodiments different beta-factors may be applied, such as via one or more of processing circuitry 84, processor 86, radio interface 82, preemption unit 34, etc., for the UCI that are multiplexed again in the pre-empting PUSCH compared to the pre-empted PUSCH. Thus, the encoding of UCI relative to PUSCH encoding may be different for pre-empted and pre-empting PUSCH. For example, UCI on pre-empted PUSCH may comprise ACK/ (negative ACK) NACK related to critical PDSCH while the pre-empted PUSCH data may be non-critical. In this case, a large beta-factor may be applied for the ACK/NACK part of the UCI in pre-empted PUSCH. Since pre-empting PUSCH is critical it may have reliable encoding and beta-factor for ACK/NACK of UCI in pre-empting PUSCH may hence not need to be large.

In another variant embodiment, some UCIs are configured so that they cannot be multiplexed. As a general rule, those UCIs are considered to be non-time-critical. Examples of these non-time critical UCIs include:

Example 4. Channel State Information (CSI): In general, some CSI may be characterized as non-critical while other CSI may be characterized as more critical. For example, CSI relating to a significant change in quality of monitored beams may be important to be sent such as via one or more of processing circuitry 84, processor 86, radio interface 82, preemption unit 34, etc., to the network node 16 in order for the network node 16 to be able to change to a better beam.

Example 4a. Similar to discussion above, treatment of the CSI can be further differentiated based on one or more characteristics of the CSI report. For instance, one or more of the following characteristics may be used and/or considered: the CSI is periodic or semi-persistent or aperiodic, CSI-part1 vs CSI-part2, number of CSI bits, the BLER target used in CQI calculation, etc.

Example 5. ACK/NACK relating to PDSCH transmission that is characterized as non-critical.

In a follow-up embodiment, in the event where a network node 16 managed to successfully decode the UCI multiplexed with PUSCH 1, there are several options:

Option 1. The network node 16 takes no action when receiving UCI multiplexed with the PUSCH 2, i.e., network node 16 determines such as via one or more of processing circuitry 68, processor 70, radio interface 62, allocation unit 32, etc., to take no action.

Option 2. The network node 16 such as via one or more of processing circuitry 68, processor 70, radio interface 62, allocation unit 32, etc., combines both UCI (sent over both PUSCH 1 and 2) to enhance receiving.

Prioritization URLLC PUSCH with SRS

In NR, in the time domain, up to 6 OFDM symbols can be used for SRS transmission. A resource spans N=1, 2, or 4 adjacent OFDM symbols within the last 6 symbols of a slot. In the frequency domain, the SRS resource granularity is 4 PRB, and the BW occupied by SRS can range from a minimum of 4 PRB to a maximum of 272 PRBs. Thus, it is possible that PUSCH will collide with SRS transmission, and a prioritization rule may be necessary.

In one or more embodiments, if the pre-empting PUSCH overlaps in time (i.e., OFDM or DFT-s-OFDM symbol) with SRS, then SRS is always dropped regardless of the SRS type such as via one or more of processing circuitry 84, processor 86, radio interface 82, preemption unit 34, etc.

In one or more embodiments, the prioritization rule takes into account the SRS type (aperiodic, semi-persistent, or periodic). The aperiodic SRS is triggered by DCI and is considered more urgent than semi-persistent or periodic type of SRS. Thus, as an example, the prioritization rule can use the following prioritization order, from high priority (1) to low priority (4):

1. Dynamically scheduled PUSCH carrying URLLC traffic;
2. Aperiodic SRS;
3. Semi-persistently scheduled PUSCH (i.e., associated with UL configured grant);
4. Semi-persistent or periodic type of SRS One or more prioritization rules may be applied such as via one or more of processing circuitry 84, processor 86, radio interface 82, preemption unit 34, etc.

Accordingly, the disclosure provides a system, methods, wireless device 22 and network node 16 that re-allocates at least a portion of the UCI in the preempted UL PUSCH. Therefore, the disclosure advantageously provides that at least a portion of the UCI, which can also be important, in the preempted UL PUSCH is not lost due to intra-wireless device UL preemption.

SOME EXAMPLES

Example A1. A network node 16 configured to communicate with a wireless device 22, the network node 16 configured to, and/or comprising a radio interface 62 and/or comprising processing circuitry 68 configured to:

allocate resources to the wireless devices 22, the allocated resources corresponding to preemption of at least a portion of a first uplink shared channel, the first uplink shared channel including control information; and optionally receive the at least a portion of the control information that was relocated from the first uplink shared channel.

Example A2. The network node 16 of Example A1, wherein the at least a portion of the control information is relocated to a second uplink shared channel and has at least one different characteristic than when the control information was scheduled on the first uplink shared channel.

Example A3. The network node 16 of Example A1, wherein the at least one different characteristic includes at least one of beta-factors and encoding.

Example B1. A method implemented in a network node 16 that is configured to communicate with a wireless device 22, the method comprising:

allocating resources to the wireless devices 22, the allocated resources corresponding to preemption of at least a portion of a first uplink shared channel, the first uplink shared channel including control information; and optionally receiving the at least a portion of the control information that was relocated from the first uplink shared channel.

Example B2. The method of Example B1, wherein the at least a portion of the control information is relocated to a second uplink shared channel and has at least one different characteristic than when the control information was scheduled on the first uplink shared channel.

Example B3. The method of Example B1, wherein the at least one different characteristic includes at least one of beta-factors and encoding.

Example C1. A wireless device 22 configured to communicate with a network node 16, the wireless device 22 configured to, and/or comprising a radio interface 82 and/or processing circuitry 84 configured to:

relocate at least a portion of control information from a first uplink shared channel for transmission, at least a portion of the first uplink shared channel being preempted; and optionally transmit the at least a portion of the control information based at least in part on the relocation.

Example C2. The wireless device 22 of Example C1, wherein the at least a portion of the control information is relocated to a second uplink shared channel and has at least one different characteristic than when the control information was scheduled on the first uplink shared channel.

Example C3. The wireless device 22 of Example C1, wherein the at least one different characteristic includes at least one of beta-factors and encoding.

Example D1. A method implemented in a wireless device wireless device (22), the method comprising:

relocating at least a portion of control information from a first uplink shared channel for transmission, at least a portion of the first uplink shared channel being preempted; and optionally transmitting the at least a portion of the control information based at least in part on the relocation.

Example D2. The method of Example D1, wherein the at least a portion of the control information is relocated to a second uplink shared channel and has at least one different characteristic than when the control information was scheduled on the first uplink shared channel.

Example D3. The method of Example D1, wherein the at least one different characteristic includes at least one of beta-factors and encoding.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). Computer program, program product or computer storage medium may include instructions such as computer program code which when executed on a processor performs any one of the methods/concepts described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device, comprising:
processing circuitry for determining whether uplink control information (UCI) is to be preempted, the processing circuitry configured to:
determine a priority of (UCI) based on whether the UCI is one of a periodic type, semi-persistent type and aperiodic type, the periodic type and semi-persistent type corresponding to a priority for which the UCI of a preempted scheduled data transmission is omitted from inclusion in a preempting scheduled data transmission and the aperiodic type corresponding to a priority for which the UCI of a preempted scheduled data transmission is included in the preempting scheduled data transmission; and
determine whether to include the UCI of the preempted scheduled data transmission in the preempting scheduled data transmission based at least in part on the determined priority.

2. The wireless device of claim 1, wherein the UCI corresponds to a Channel State Information (CSI) type.

3. The wireless device of claim 1, wherein the UCI corresponds to a sounding reference signal (SRS) type.

4. The wireless device of claim 2, wherein a plurality of bits of the UCI are multiplexed on a first physical uplink shared channel (PUSCH) that is pre-empted by a second PUSCH.

5. A method performed by a wireless device, for determining whether a uplink control information (UCI) is to be preempted, the method comprising:
determining a priority of UCI based on whether the UCI is one of a periodic type, semi-persistent type and aperiodic type, the periodic type and semi-persistent type corresponding to a priority for which the UCI of a preempted scheduled data transmission is omitted from inclusion in a preempting scheduled data transmission and the aperiodic type corresponding to a priority for which the UCI of a preempted scheduled data transmission is included in the preempting scheduled data transmission; and determining whether to include the UCI of a preempted scheduled data transmission in the preempting scheduled data transmission based at least in part on the first priority.

6. The method of claim 5, wherein the UCI corresponds to a Channel State Information (CSI) type.

7. The method of claim 5, wherein the UCI corresponds to a sounding reference signal (SRS) type.

8. The method of claim 5, wherein a plurality of bits of the UCI are multiplexed on a first physical uplink shared channel (PUSCH) that is pre-empted by a second PUSCH.

9. A network node, comprising:
processing circuitry configured to:
schedule a wireless device for uplink shared channel data transmission on allocated resources, the scheduled data transmission on the allocated resources preempting uplink control information (UCI); and
receive the UCI in the scheduled data transmission on the allocated resources based on a priority of the UCI, the priority being based on whether the UCI is one of a periodic type, semi-persistent type and aperiodic type, the periodic type and semi-persistent type correspond to a priority that for which the UCI of a preempted scheduled data transmission is omitted from inclusion in a preempting scheduled data transmission and the aperiodic type corresponds to a priority for which the UCI of a preempted scheduled data transmission is included in the preempting scheduled data transmission.

10. The network node of claim 9, wherein the UCI corresponds to a Channel State Information (CSI) type.

11. The network node of claim 9, wherein the UCI corresponds to a sounding reference signal (SRS) type.

12. The network node of claim 9, wherein a plurality of bits of the UCI are multiplexed on a first physical uplink shared channel (PUSCH) that is pre-empted by a second PUSCH.

13. A method implemented by a network node, the method comprising:
scheduling a wireless device for uplink shared channel data transmission on allocated resources, the scheduled data transmission on the allocated resources preempting uplink control information (UCI); and
receiving the UCI in the scheduled data transmission on the allocated resources based on a priority of the uplink control information, the priority being based on whether the UCI is one of a periodic type, semi-persistent type and aperiodic type, the periodic type and semi-persistent type corresponding to a priority for which the UCI of a preempted scheduled data transmission is omitted from inclusion in a preempting scheduled data transmission and the aperiodic type corresponding to a priority for which the UCI of a preempted scheduled data transmission is included in the preempting scheduled data transmission.

14. The method of claim 13, wherein the UCI corresponds to a Channel State Information (CSI) type.

15. The method of claim 13, wherein the UCI type corresponds to a sounding reference signal (SRS) type.

16. The method of claim 13, wherein a plurality of bits of the UCI are multiplexed on a first physical uplink shared channel (PUSCH) that is pre-empted by a second PUSCH.

17. A computer storage medium comprising instructions which when executed on a processor perform a method for determining whether a uplink control information (UCI) is to be preempted, the method comprising:
determining a priority of UCI based on whether the uplink control information is one of a periodic type, semi-persistent type and aperiodic type, the periodic type and semi-persistent type corresponding to a priority for which the UCI of a preempted scheduled data transmission is omitted from inclusion in a preempting scheduled data transmission and the aperiodic type corresponding to a priority for which the UCI of a preempted scheduled data transmission is included in the preempting scheduled data transmission; and
determining whether to include the UCI of the preempted scheduled data transmission in the preempting scheduled data transmission based at least in part on the first priority.

* * * * *